United States Patent [19]
Davies

[11] Patent Number: 5,074,719
[45] Date of Patent: Dec. 24, 1991

[54] METHOD OF REGULATING THE OVERFLOW FROM A CYCLONE, HYDROCYCLONE OR SIMILAR DEVICE

[75] Inventor: Simon R. H. Davies, Edinburgh, Scotland

[73] Assignee: Orkney Water Test Centre Limited, Scotland

[21] Appl. No.: 619,215

[22] Filed: Nov. 28, 1990

[30] Foreign Application Priority Data

Nov. 28, 1989 [GB] United Kingdom ................. 8926889

[51] Int. Cl.[5] ............................................... B65G 53/60

[52] U.S. Cl. .................................... 406/173; 209/211; 209/144; 210/512.1; 55/459.1; 137/810

[58] Field of Search ................ 406/173; 209/211, 144; 210/512.1; 55/459.1; 137/810, 812, 813

[56] References Cited

U.S. PATENT DOCUMENTS

| | | | |
|---|---|---|---|
| 3,195,303 | 7/1965 | Widell | 137/813 X |
| 3,410,291 | 11/1968 | Boothe et al. | 137/810 X |
| 3,674,044 | 7/1972 | Mayer | 137/812 |
| 3,674,045 | 7/1972 | Millman et al. | 137/813 |
| 3,707,159 | 12/1972 | Eastman | 137/810 |
| 3,707,440 | 12/1972 | Frederick | 137/810 X |
| 4,311,270 | 1/1982 | Hovstadius . | |
| 4,536,285 | 8/1985 | Karlsson . | |
| 4,819,431 | 4/1989 | Abbott | 137/813 X |
| 4,887,628 | 12/1989 | Bowe et al. | 137/813 X |
| 4,917,151 | 4/1990 | Blanchard et al. | 137/813 X |

FOREIGN PATENT DOCUMENTS

| | | | |
|---|---|---|---|
| 1006803 | 3/1983 | U.S.S.R. | 137/812 |
| 2231685 | 11/1990 | United Kingdom | 137/813 |
| WO87/01968 | 4/1987 | World Int. Prop. O. . | |

*Primary Examiner*—Margaret A. Focarino
*Assistant Examiner*—James M. Kannofsky
*Attorney, Agent, or Firm*—Ostrolenk, Faber, Gerb & Soffen

[57] ABSTRACT

A method of regulating the overflow from a cyclone, hydrocyclone or similar device (1) comprises the steps of passing the overflow (1C) to the main inlet (3C) of a fluidic valve (3) and passing at least a proportion of the underflow (1B) from the device (1) to the control inlet (3B) of the said fluidic valve (3). The flowrate of the overflow (1C) leaving the device (1) is maintained despite variations in feed flowrate or feed flow pressure (1A). Preferably, the underflow (1B) or proportion thereof is passed through a restriction (2) before being passed to the control inlet (3B) of the fluidic valve (3).

5 Claims, 1 Drawing Sheet

METHOD OF REGULATING THE OVERFLOW FROM A CYCLONE, HYDROCYCLONE OR SIMILAR DEVICE

FIELD OF THE INVENTION

The invention relates to a method of regulating the overflow (or reject flow) from a cyclone, hydrocyclone or similar device. For the sake of convenience, all further reference to a hydrocyclone shall be taken to include a reference to a cyclone or other similar device. The method is particularly suitable for use with a device having a relatively small overflow as compared with the underflow (or product flow).

BACKGROUND TO THE INVENTION

In a hydrocyclone, as the feed flowrate through the unit increases (at a fixed feed pressure), the pressure reductions from feed to overflow and from feed to underflow both increase. Thus the static pressures at the overflow and underflow of the unit both decrease. Furthermore, the static pressure at the underflow is always greater than the static pressure at the overflow. Recommended practice for many hydrocyclones states either that the ratio of overflow to feed flow (sometimes called the reject ratio) should remain constant, or that the overflow should itself remain constant, whatever the feed flow. Thus regulation of the overflow is required.

Conventionally, in order to regulate the overflow, a complex control system comprising flow and/or differential pressure measuring devices, a control valve and associated electrical and/or pneumatic supplies would be required. Such a system is expensive to install and operate and can be subject to wear, particularly in areas comprising moving parts, e.g. the valve.

It is an object of the invention to provide a method of regulating the overflow of a hydrocyclone which is effective, simple and inexpensive to construct and easy to maintain.

SUMMARY OF THE INVENTION

The invention provides a method of regulating the overflow from a cyclone, hydrocyclone or similar device, comprising the steps of passing the overflow to the main inlet of a fluidic valve and passing at least a proportion of the underflow from the device to the control inlet of the said fluidic valve, such that the flowrate of the overflow leaving the device is maintained despite variations in feed flowrate or feed flow pressure.

Preferably, the underflow or proportion thereof is passed through a restriction before being passed to the control inlet of the fluidic valve. More preferably an increase in the flow of underflow or proportion thereof passed to the control inlet of the fluidic valve results in a decrease in flow rate of the overflow.

A method as described above achieves reliable control of the overflow. Use of a fluidic valve obviates the need for conventional valves and thus reduces the likelihood of failure since no moving parts are involved. The method, once set up satisfactorily, is self-regulating and requires little or no maintenance.

The invention also provides apparatus for carrying out the method described above comprising a cyclone, hydrocyclone or similar device having an inlet, an overflow and an underflow, and a fluidic valve, wherein the overflow of the device is connected to the main inlet of the fluidic valve and the underflow of the device is connected to the control inlet of the fluidic valve.

Preferably, a restriction is located between the control inlet of the fluidic valve and the main underflow path from the device.

BRIEF DESCRIPTION OF THE DRAWINGS

An embodiment of the invention will now be described by way of example only with reference to the accompanying drawing wherein.

DETAILED DESCRIPTION OF THE DRAWINGS

Figure 1:
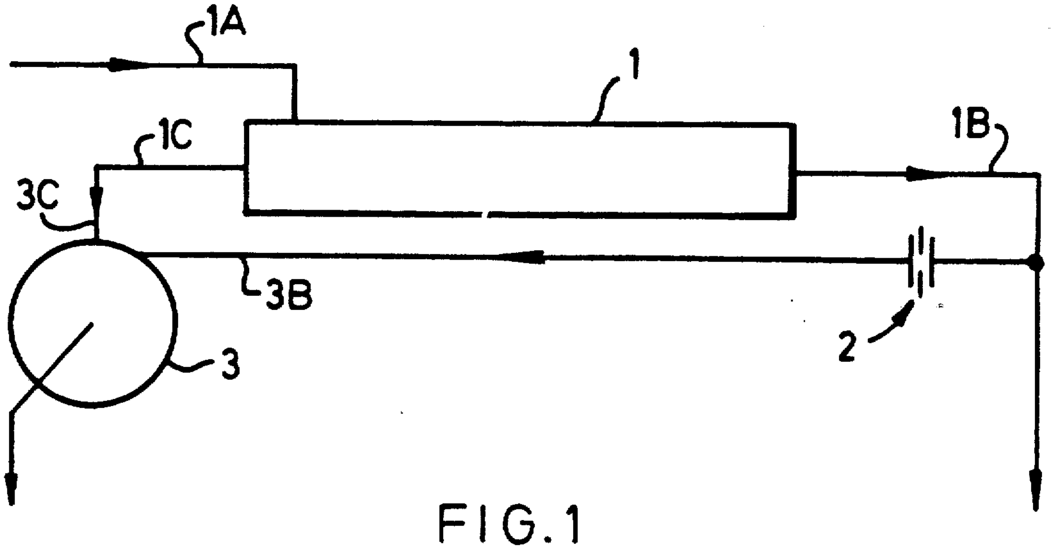
FIG. 1 is a schematic representation of a method according to the invention.

For a given feed flowrate and feed pressure, fluid enters the hydrocyclone 1 via the hydrocyclone feed or inlet 1A. Separation occurs within the hydrocyclone 1 and the lighter materials exit via the overflow 1C whilst the heavier materials exit via the underflow 1B. A sidestream flow of underflow 1B which is at a higher pressure than the overflow 1C is taken, passed through a restriction 2 (which could be an orifice, fluidic diode or similar) and then passed to the control inlet 3B of a fluidic valve 3. This control flow to the control inlet 3B regulates the flow of overflow 1C from the hydrocyclone 1 which enters the main inlet 3C of the fluidic valve.

The fluidic valve has a substantially cylindrical chamber with a main inlet arranged substantially radially of the chamber and a control inlet arranged substantially tangentially of the chamber. The outlet is arranged along the axis of the chamber and, when no control inlet fluid is present, fluid can flow uninterrupted from the main inlet to the outlet. As soon as fluid is introduced to the chamber via the tangential control inlet, a vortex is set up in the chamber which restricts the flow through the main inlet. Thus the flowrate of the overflow is dependent upon the amount of underflow entering the valve via the control inlet.

If the feed flowrate is increased whilst the feed pressure remains constant, the pressure reductions in the hydrocyclone 1 increase, thus less pressure is available at the underflow 1B and still less at the overflow 1C. In order to maintain the desired flowrate of overflow the fluidic valve must partially open. Because less pressure is available at the underflow 1B, less material passes through the restriction 2 and hence the flow of material entering the control inlet of the fluidic valve 3 is less. This is equivalent to partially opening the valve.

If the feed flowrate remains constant but the feed pressure is increased, the pressure reductions in the hydrocyclone 1 will remain constant but the static pressures at the overflow 1C and underflow 1B will both increase. Thus in order to maintain the same flow from the overflow 1C, the fluidic valve must partially close. Because more pressure is available at the underflow 1B, more material passes through the restriction 2 and hence the flow of material entering the control inlet 3B of the fluidic valve 3 increases. This is the equivalent of partially closing the valve.

Thus the invention provides a method of regulating the overflow from a hydrocyclone which is less complex and less susceptible to failure than known methods. In particular, the fluidic valve is self-regulating and incorporates no moving parts which minimizes the risk of failure of the valve.

We claim:

1. A method of regulating overflow from a hydrocyclone, comprising the steps of passing the overflow to a main inlet of a fluidic valve and passing at least a proportion of under flow from the hydrocyclone to a control inlet of the fluidic valve, such that the flow rate of the overflow leaving the hydrocyclone is maintained despite variations in feed flow rate or feed flow pressure.

2. A method as claimed in claim 1, wherein the under flow or a proportion of the under flow thereof is passed through a restriction before being passed to the control inlet of the fluidic valve.

3. A method as claimed in claim 1, wherein an increase in the flow of the under flow or a proportion of the under flow thereof passed to the control inlet of the fluidic valve results in a decrease in flow rate of the overflow.

4. Apparatus comprising a hydrocyclone having an inlet, an overflow and an under flow, and a fluidic valve, wherein the overflow of the hydrocyclone is connected to a main inlet of the fluidic valve and the under flow of the hydrocyclone is connected to a control inlet of the fluidic valve.

5. Apparatus as claimed in claim 4, wherein a restriction is located between the control inlet of the fluidic valve and the main under flow path from the hydrocyclone.

* * * * *